United States Patent [19]
Zenere

[11] Patent Number: 5,626,753
[45] Date of Patent: May 6, 1997

[54] SYSTEM AND METHOD FOR THE TRANSPORT OF LIME

[76] Inventor: David Zenere, 700 E. Joe Orr Rd., Chicago Heights, Ill. 60411

[21] Appl. No.: 662,818

[22] Filed: Jun. 12, 1996

Related U.S. Application Data

[63] Continuation of Ser. No. 398,390, Mar. 3, 1995, abandoned.

[51] Int. Cl.⁶ ..................................................... B01D 27/08
[52] U.S. Cl. ........................... 210/445; 210/460; 210/498; 210/506; 264/30; 266/269; 266/270; 266/282
[58] Field of Search ............................. 52/393, 396.01; 266/269, 270, 282; 264/30; 210/445, 460, 498, 506, 510.1

[56] References Cited

U.S. PATENT DOCUMENTS

| | | | |
|---|---|---|---|
| 3,482,703 | 12/1969 | Roberts et al. | 210/498 |
| 3,811,659 | 5/1974 | Taylor et al. | 210/445 |
| 4,543,114 | 9/1985 | Beattie et al. | 210/498 |
| 4,894,158 | 1/1990 | Morita et al. | 210/510.1 |
| 5,064,537 | 11/1991 | Chupka et al. | 210/498 |
| 5,449,459 | 9/1995 | Glaser et al. | 210/498 |

*Primary Examiner*—W. L. Walker
*Attorney, Agent, or Firm*—Brinks Hofer Gilson & Lione

[57] ABSTRACT

A filter for use in a coupling disposed between first and second tubes which convey lime from a movable carrier to a processing pot in a steel mill. The filter has a plurality of openings sized and positioned to allow passage of lime and exclude contaminants of a size larger than the size of the perimeter of selected openings reduces erosion by the lime.

7 Claims, 2 Drawing Sheets

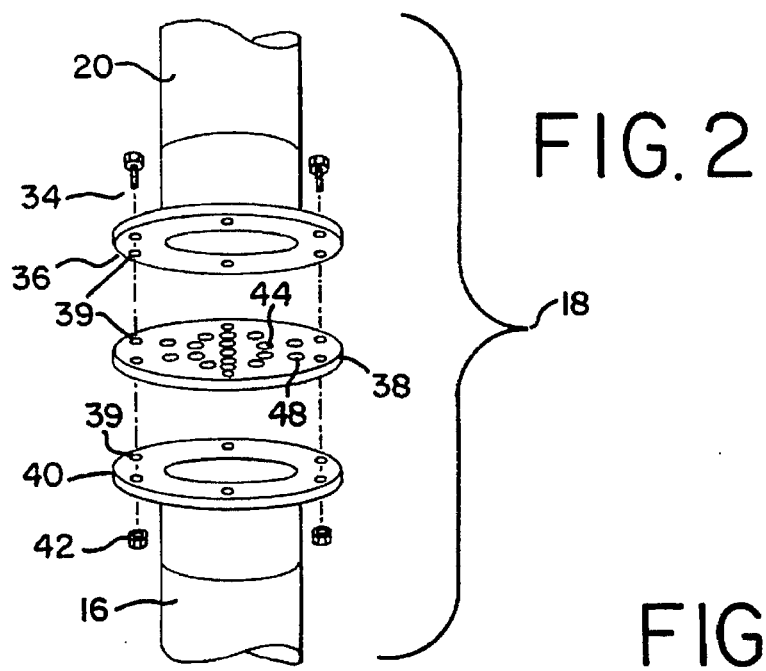
FIG. 2
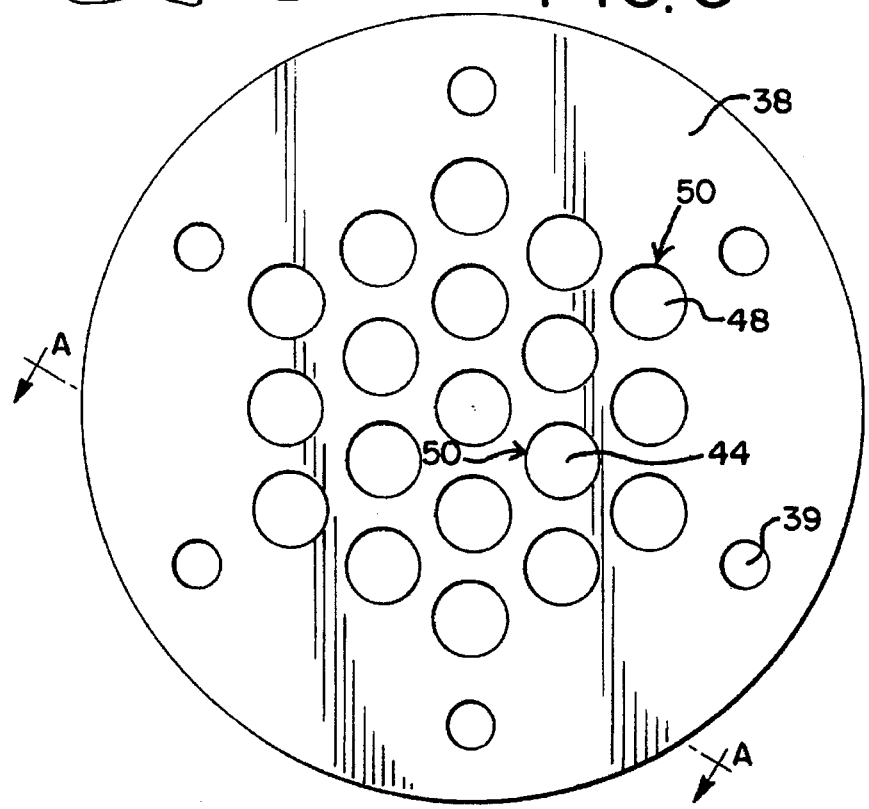
FIG. 3
FIG. 4
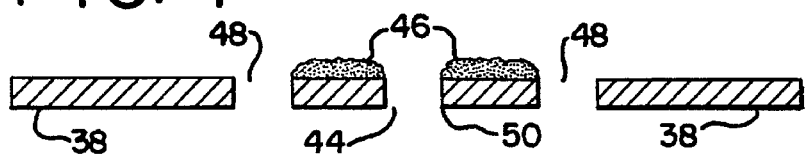

SYSTEM AND METHOD FOR THE TRANSPORT OF LIME

This application is a continuing application under 37 C.F.R. §1.62 of U. S. Ser. No. 08/398,390, filed Mar. 3, 1995, which is now abandoned.

BACKGROUND OF THE INVENTION

The present invention is generally directed to a filter through which lime passes during its transport from a source to a processing pot in a steel mill where it is used to purify steel during processing. The present invention is particularly directed to an improved filter having a plurality of openings to selectively permit lime to pass through, while retaining contaminants that are larger than the lime particles. The present invention is more particularly directed to reinforcement of the perimeter of the openings, said reinforcement directed to reducing degradation of the filter by the lime.

Powdered or granular lime is transported from a location where it is obtained to a steel mill wherein it is employed to purify steel processing. Lime is also used to coat the processing pot and other receptacles where steel is being melted to prevent steel contacting steel. For about the past 22 years, the method of transferring lime to a steel mill was to deliver it by means of a railroad car to a location close enough to a steel mill so that the lime could be transferred from the railroad car to the steel mill by means of a tubing. Generally, the lime was released from the bottom of a railroad car into a receptacle under the box car, said receptacle terminating in a tubing located below ground. A blower connected to the tubing produced air or other gas which urged the lime through the tubing to a day tank with about 2,000 ton capacity, from which nitrogen gas urged the lime from the day tank through a tube connecting the tank and receiving tank in a steel mill. The lime was conveyed from the receiving tank to a processing pot by a rear gear or auger screw.

One problem with this method is that lime settled in the receptacle under the railroad car, got wet, compacted, solidified, combusted or entered other undesirable states or dangerous states. Moreover, below ground tubing was difficult to repair.

A more serious and expensive limitation of this conventional method is caused by contaminants in the lime. Contaminants in lime generally include bricks, bottles, rocks, plastic dishware and the like. Contaminants enter the lime as it is being removed from its source and is transported to a steel mill. If they reach the steel mill, they impair or destroy the rear gear. Such a gear costs approximately $65,000. In addition to being very expensive, replacement of the gear also may be difficult or time consuming. Using conventional lime transfer methods, the gear had to be replaced at the rate of about one per month, a costly loss. An even more serious repercussion of contaminants destroying the gear is that before the gear is recognized as needing replacement, its malfunction can lead to explosions and damage costing at least $500,000.

An improvement on the railroad car-underground tube lime-transfer method is to use a pneumatic tank truck (trailer) for transport of the lime. In this method, a tube is connected directly to the truck, and the lime containing truck is pressurized to transfer lime from the truck to a day tank. Transfer from the truck to the day tank is generally by means of tubing connecting on a first end to a fitting on the truck tank and on a second end to a first end of a coupling apparatus. The second end of the coupling apparatus is joined to a tubing leading to the day tank. From the day tank, the lime was transferred to the steel mill through tubing in a conventional manner, that is, by tubing connecting the day tank to the steel mill, the lime being urged to the steel mill by means of nitrogen gas pressure pumped into the day tank.

The truck transport method solved some problems, for example, the need for underground tubing and the risk of wetting the lime. However, damage to or destruction of the rear gear in the steel mill by contaminants in the lime occurred at the same rate as in the conventional method, so the most serious problem remained.

Accordingly, there is a need in the art for a method to transfer lime to a steel mill which minimizes the risk of damage to the receiving structures of the steel mill by contaminants in the lime such as bricks, bottles and disposable dishes. There is further need in the art for a filter to remove the contaminants from the lime which is simple yet effective. There is a still further need in the art for a filter which lasts a relatively long period of time, that is, is not readily degraded by lime.

SUMMARY OF THE INVENTION

The invention therefore provides an improved filter for use in an apparatus used for transferring lime to a steel mill. "Lime" defined herein includes high calcium burnt pebble lime, calcium burnt pulverized lime, dolomitic lime, and the like.

The filter includes a plurality of openings, said openings sized and positioned to allow passage of lime, while eliminating contaminants of a size larger than the openings. The shape of the openings is preferably circular, although other shapes are within the scope of the invention as long as the shape effectively prevents passage of contaminants in the lime through the filter. The openings are created by cutting holes in a solid plate, pouring suitable material into a mold which produces openings in a plate, making a screen or mesh, or positioning bars at angles to form a matrix of openings. The size of each of the openings are preferably generally the same, but may differ. The sizes are selected to exclude contaminants of sizes generally found in lime that cause problems in the steel mill receptacles (processing pots), e.g. contaminants such as bricks, rocks, bottles, disposable dishes. These contaminants enter the lime while it is being extracted from its source and transferred to vehicles to move it to the proximity of a steel mill. Size is expressed as diameter if the openings are circular. A diameter in the range ¼ to 1 inch generally retains contaminants usually found in lime that cause problems in a steel mill.

In an illustrative embodiment, the filter of the present invention filters out contaminants greater than 0.875" diameter so that such contaminants do not enter a day tank through the discharge line from the truck carrying the lime from its source. The filter is placed in a coupling apparatus having a first and a second end. At the first end, the coupling apparatus is coupled with a tube having an air source (pressurized to about 15 psi) for receiving and transferring a flow of lime from a pneumatic tank and is coupled on the second end to a tube transferring the filtered lime to a day tank, that is, a holding tank. From the holding tank, the lime is urged by gas, such as nitrogen, through tubing to the steel mill.

The filter is generally of circular shape, but may be any shape that is configured to fit within the coupling apparatus. An improvement on the filter comprises a reinforced perimeter around each opening. The reinforcement is preferably constructed from a hardened rod used for welding or soldering. Other materials are suitable for reinforcement if they are abrasion resistant. Suitable such other materials include hardened steel and teflon. Some of these materials, although technically operative, are not preferred because of their cost. A preferred structure provides rims around some of the openings with an abrasion-resistant material such as those disclosed herein. Depending on the shape and method of construction of the openings, the reinforcement may be achieved either by creating a rim around an opening, spraying the entire filter, or creating an entire filter of an abrasion resistant material. The filter base is preferably composed of steel, most preferably hardened steel.

Using a filter of the present invention wherein approximately 500 net tons of lime per day (the equivalent to approximately 17 trailer loads of lime) are generally transported to a receiving apparatus of a steel mill, no contaminants were noted to have entered the steel mill, and the filter showed no abrasion after at least four months of continuous use. Contaminants collected at the junction of the coupling apparatus and the tubing leading from the truck to the coupling apparatus. The tubing is disconnected to remove the contaminants.

It is therefore an advantage of the present invention to provide a filter through which lime passes during its transport from a source to a processing pot in a steel mill where the lime is used to purify steel during processing.

It is a further advantage of the present invention to provide an improved filter having a plurality of openings to selectively permit lime to pass through, while retaining contaminants that are larger than lime particles.

It is a still further advantage of the present invention to provide reinforcement of the perimeter of the opening, said reinforcement being directed to reducing degradation of the filter by the lime.

Further objects and features of the present invention will be apparent from the following specification and claims when considered in connection with the accompanying drawings illustrating the preferred embodiment of the invention.

DETAILED DESCRIPTION OF THE DRAWINGS

FIG. 2 is an exploded view of a coupling apparatus according to the present invention for use in the system of FIG. 1.

FIG. 3 is a top view of a filter according to the present invention for use with the coupling apparatus of FIG. 2.

FIG. 4 is a cross section of the filter of FIG. 3 taken along line A-A' in FIG. 3.

DETAILED DESCRIPTION OF THE PREFERRED EMBODIMENT

Figure 1:
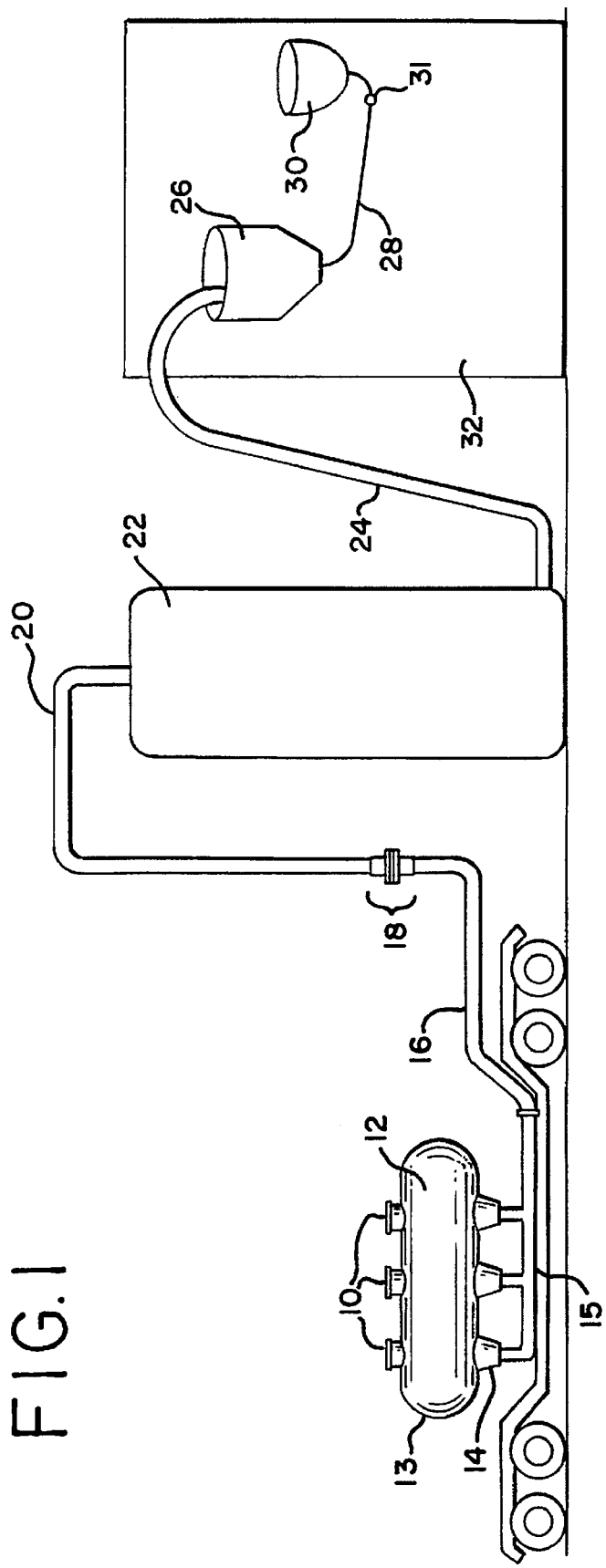
FIG. 1 is an illustration of a system for conveying lime from a transport tank truck to a steel mill.

FIG. 1 is an illustration of a system for conveying lime from a transport tank truck to a steel mill. Hatches 10 are positioned on the surface of a pneumatic tank (trailer) 12 with pods 14. Lime is transferred from its source through the hatches 10 into the tank 12 and urged out of the tank 12 by air pressure 13 through a flow pipe 15, into tubing 16. Discharge of lime from the truck to the day tank is preferably through a four-inch line. The tubing 16 is coupled to a first end of a coupling apparatus 18. A second end of the coupling apparatus 18 is coupled to tubing 20 which leads into a day tank (holding tank) 22. Lime is urged out of the day tank 22 by pressurized nitrogen gas applying a force 21 into a tubing 24 attached to the tank 22. Tubing 24 attaches to a measuring bin 26 in a steel mill 32. The measuring bin 26 connects to processing pot 30 via tubing 28. Lime travels from the holding tank 22 through tubing 24 into a measuring bin 26 in a steel mill 32, and finally through tubing 28 to processing pot 30. A rear gear 31 is positioned in tubing 28.

FIG. 2 is an exploded view of a coupling apparatus according to the present invention for use in the system of FIG. 1. A coupling apparatus 18 couples tubing 16 with tubing 20. The coupling apparatus comprises a first end 40 which is attached to tubing 16, and a second end 36, which is attached to tubing 20. The coupling apparatus is readily detachable from tubings 16 and 20. The first end 40 of the coupling apparatus 18 is separable from the second end 36, and the first and the second ends are joined by means of fasteners such as screws 34 and nuts 42 placed through apertures 39 in the first 40 and the second 36 ends of the coupling apparatus 18, and in the filter 38.

The filter 38, shown in the preferred embodiment of FIG. 2 is a circular plate 38 having a plurality of inner openings 44, and outer openings 48; openings 44, 48 in the embodiment of FIG. 2 are circular. The filter 38 is positioned between the first end 40 and the second end 36 of the coupling apparatus 18 and sealed by the fastener mechanism comprising screws 34 and nuts 42. Apertures 39 receive screws 34, so that the lime transferred through the tubing 16 to the tubing 20 is contained within the coupling apparatus 18.

FIG. 3 is a top view of a filter according to the present invention for use with the coupling apparatus of FIG.2. A filter shown in the embodiment of FIG. 3 is generally in the shape of a circular plate 38 having a plurality of inner openings 44 and outer openings 48 which may be masked when the coupling apparatus is assembled, e.g. part of the perimeter of the outer openings 48. The perimeters 50 of the openings 44 and 48 are reinforced to reduce abrasion and damage due to contact of the filter 38 with lime, except where the perimeters 50 are masked when the coupling apparatus is assembled.

FIG. 4 is a cross section of the filter of FIG. 3 taken along line A-A' in FIG. 3. The inner openings 44 of the filter 38 have their perimeters 50 reinforced with a raised, solid, abrasion resistant rim 46. The rim 46 is preferably made of a soldering bond material, but other compositions are also suitable, so long as the material is resistant to lime abrasion.

The rims 46 may be reinforced only on one side of the filter 38 or may be reinforced on both sides. At least the side of the filter 38 toward the second end 40 of coupling apparatus 18 (FIG. 2) should have reinforced rims 46.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

I claim:

1. A method for transporting dry lime from a movable carrier to a processing pot in a steel mill and preventing contaminants that could damage components of the steel mill from being transported with the lime, said method comprising:

transporting dry lime from the movable carrier through a tubing in which a filter is positioned to exclude the contaminants commonly present in lime, said filter comprising a plurality of openings sized and positioned to allow passage of the lime and to exclude contaminants of a size larger than the size of the opening;

wherein said filter is reinforced at least on a portion of the perimeter of selected openings of said plurality of openings, said reinforcements comprised of material resistant to corrosion by lime; and transporting the filtered dry lime to the processing pot in a steel mill.

2. The method of claim 1, wherein the contaminants are of a size characteristic of bricks, rocks, bottles and disposable dishes.

3. The method of claim 1 wherein the openings in the filter are circular and are sized to have diameters that are about ¼ to 1 inch in diameter.

4. The method of claim 1 wherein the filter is a solid plate sized and configured to be positioned within a tubing of about 4 inches in diameter.

5. A transport which conveys dry lime from a movable carrier to a processing pot in a steel mill by means of pressurized gas, said transport comprising a first tubing connecting on a first end to a fitting on the movable carrier and on a second end to a first end of a coupling apparatus, and wherein a second end of the coupling apparatus is joined to a second tubing leading to a holding tank, and wherein a filter is positioned within said coupling apparatus, said filter comprising:

a plurality of openings sized and positioned to allow passage of lime and exclude contaminants of a size characteristic of contaminants commonly found in dry lime, said size larger than the size of the opening;

and a reinforcement to at least a portion of a perimeter of selected openings of said plurality of openings, said reinforcement being comprised of material resistant to corrosion by lime;

and wherein contaminants commonly found in lime comprise sizes characteristic of bricks, rocks, bottles and disposable dishes.

6. The transport of claim 5, wherein the filter is a solid plate and wherein the plurality of openings are circular and sized to have a diameter in the range of about ¼ to 1 inch.

7. The transport of claim 6, wherein the filter is a solid plate sized and configured to fit in a coupling apparatus between first and second tubings that are each about 4 inches in diameter.

* * * * *